United States Patent
Zhao

(10) Patent No.: US 7,688,169 B2
(45) Date of Patent: Mar. 30, 2010

(54) LONG-PROPORTIONAL-STROKE FORCE MOTOR

(75) Inventor: Shen Zhao, Miyota-machi (JP)

(73) Assignee: Minebea Co., Ltd. (JP)

( * ) Notice: Subject to any disclaimer, the term of this patent is extended or adjusted under 35 U.S.C. 154(b) by 265 days.

(21) Appl. No.: 11/919,876

(22) PCT Filed: May 29, 2006

(86) PCT No.: PCT/JP2006/310651

§ 371 (c)(1),
(2), (4) Date: Nov. 5, 2007

(87) PCT Pub. No.: WO2006/129596

PCT Pub. Date: Dec. 7, 2006

(65) Prior Publication Data

US 2009/0051471 A1    Feb. 26, 2009

(30) Foreign Application Priority Data

May 31, 2005  (JP) .............................. 2005-160738

(51) Int. Cl.
*H01F 7/08* (2006.01)
(52) U.S. Cl. .................. 335/220; 335/261; 335/273; 335/278; 335/279; 335/281; 310/12.01; 310/12.02; 310/14; 310/15
(58) Field of Classification Search ................ 335/220, 335/249, 251, 255, 258, 261, 262, 273, 274, 335/278, 279, 281, 296, 297; 310/12.01, 310/12.02, 14, 15, 23, 30, 34
See application file for complete search history.

(56) References Cited

U.S. PATENT DOCUMENTS 1,817,592 A * 8/1931 Sokoloff ..................... 335/259

(Continued)

FOREIGN PATENT DOCUMENTS

JP        154610/1989        10/1989

(Continued)

*Primary Examiner*—Elvin G Enad
*Assistant Examiner*—Mohamad A Musleh
(74) *Attorney, Agent, or Firm*—Bacon & Thomas, PLLC

(57) ABSTRACT

A long-proportional-stroke force motor which outputs force proportional to the exciting current. The motor has a magnetic circuit wherein a non-magnetic spacer is positioned axially between a magnetic guide and a magnetic sleeve. An armature moves within a central opening defined by the guide, the spacer and the sleeve. An end portion of the guide, adjacent to the spacer, has a sectional profile through a stepped surface facing radially outward and the corners of the steps define a curve which satisfies the following expressions:

$$\frac{dY}{dX} > 0, \quad \frac{d^2Y}{dX^2} > 0,$$

where X is a coordinate on an X-axis corresponding to a central axis of the guide; wherein the armature is moved in a direction along the X-axis by application of exciting current to a coil surrounding the guide, spacer and sleeve; and Y is a coordinate on an axis orthogonal to the X-axis.

4 Claims, 11 Drawing Sheets

U.S. PATENT DOCUMENTS

| | | | |
|---|---|---|---|
| 5,467,962 A * | 11/1995 | Bircann et al. | 251/129.15 |
| 5,546,064 A * | 8/1996 | Sallam et al. | 335/261 |
| 5,571,248 A * | 11/1996 | Seetharaman et al. | 137/625.65 |
| 5,687,698 A * | 11/1997 | Mastro et al. | 123/568.26 |
| 6,615,780 B1 * | 9/2003 | Lin et al. | 123/90.17 |
| 6,737,946 B2 * | 5/2004 | Seale et al. | 335/279 |
| 6,759,934 B2 * | 7/2004 | Bircann et al. | 335/255 |
| 7,455,075 B2 * | 11/2008 | Xu et al. | 137/627.5 |
| 2001/0033214 A1 * | 10/2001 | Bircann et al. | 335/220 |

FOREIGN PATENT DOCUMENTS

| | | |
|---|---|---|
| JP | 5-114512 | 5/1993 |
| JP | S61-287108 | 12/1996 |
| JP | 2000-277327 | 10/2000 |
| JP | 2004-218816 | 8/2004 |

* cited by examiner

LONG-PROPORTIONAL-STROKE FORCE MOTOR

TECHNICAL FIELD

The present invention relates to a proportional solenoid which serves as a drive source for carrying out accurate control of a servovalve, or the like, and more particularly to a long-proportional-stroke force motor configured to lengthen a proportional stroke in which control can be carried out so as to accurately displace an armature to a desired position in accordance with current applied to a coil and to maintain the armature at the desired position against variations of load.

BACKGROUND ART

The stroke of a proportional solenoid consists of a proportional stroke portion and a nonproportional stroke portion. In the proportional stroke portion, the solenoid can generate a magnetic force substantially proportional to current applied to a coil, and the position of an armature can be controlled by means of the magnetic force. In the nonproportional stroke portion, such control cannot be carried out. Usually, only the proportional stroke portion is used.

A conventional proportional solenoid generally has a length of the above-mentioned proportional stroke of about 2 or 3 mm as well as a large volume. Accordingly, the proportional solenoid has a length 10 times or more the length of a proportional range (the above-mentioned proportional stroke), resulting in an increase in manufacturing cost.

Patent Document 1 shows an example of a conventional method for extending the proportional range of a stroke.

FIG. 11 is an explanatory view of a proportional solenoid disclosed in Patent Document 1.

FIG. 11(a) is a sectional view showing essential portions of the proportional solenoid, excluding a coil wound on a bobbin, and a yoke which forms a magnetic path.

A stationary core 101 has an annular projection 103 at its end located on a side toward an armature 102. The annular projection 103 has a frusto-conical surface 103a extending toward a center axis, and a central recess 108 formed in the annular projection 103.

The armature 102 has an annular projection 104 at its end located on a side toward the stationary core 101, the annular projection 104 being received in the recess 108. The annular projection 104 has a conical recess 104b having a conical surface 104a extending outward from the center axis.

Such a conical section in which the annular projection 103 of the stationary core 101 having the inward extending frusto-conical surface 103a and the annular projection 104 of the armature 102 having the outward extending conical surface 104a move in a mutually overlapping manner exhibits a force vs. stroke characteristic having a linear segment as shown in FIG. 11(b).

In FIG. 11(b), a characteristic 111 between line B and line C is a substantially constant force vs. stroke characteristic, and a characteristic 112 between line C and line E shows an overtravel stroke. The overtravel stroke is used when an additional stroke gap is required beyond the characteristic 111. A broken-line characteristic 110 between line A and line B is a generally undesirable force-rising characteristic.

In order to eliminate the force-rising characteristic 110, a non-magnetic brass shim 105 having a thickness equal to the length between line A and line B is disposed as a stopper at a portion of stroke between line B and line A. Specifically, the shim 105 is secured to a push rod 106 so as to be disposed between the surface of the recess 108 of the stationary core 101 and the end face of the projection 104 of the armature 102.

Patent Document 1: Japanese Patent Application Laid-Open

DISCLOSURE OF THE INVENTION

Problems to be Solved by the Invention

In the example described in Patent Document 1, the substantially constant magnetic force vs. stroke characteristic 111 has a length of about 3.3 mm, which is not a very long stroke. The substantially constant magnetic force vs. stroke characteristic 111 appears linearly in the drawing. However, the drawing shows merely a rough characteristic, and the attainment of a constant magnetic force vs. stroke characteristic is not confirmed by those skilled in the art. The technique that uses the conical section in which the annular projection 103 of the stationary core 101 having the inward extending frusto-conical surface 103a and the annular projection 104 of the armature 102 having the outward extending conical surface 104a move in a mutually overlapping manner is understood to be a technique for a narrow stroke range. Furthermore, the conical recess 104b is long and accordingly is difficult to machine.

An object of the present invention is to provide a long-proportional-stroke force motor having a high ratio of stroke to an overall size.

Another object of the present invention is to provide a long-proportional-stroke force motor capable of providing a longer proportional stroke in relation to its overall size, as compared with a conventional case.

The long-proportional-stroke force motor of the present invention can be applied particularly to applications requiring a proportional stroke of 4 mm or more.

Means for Solving the Problems

To achieve the above objects, the present invention employs the following means while focusing on factors which are influential in a proportional range of stroke, such as the structure of a guide and an armature and the overall structure of a force motor.

(1) A long-proportional-stroke force motor comprises a magnetic circuit configured such that a spacer made of a non-magnetic material intervenes between a guide made of a magnetic material and a sleeve made of a magnetic material, and an armature made of a magnetic material and disposed movably in the interior of the magnetic circuit. A side, located opposite to the armature, of a sectional profile of an end portion of the guide, the end portion being adjacent to the spacer, includes points located on a curve which satisfies both expressions in the following Expression 1, $$\frac{dY}{dX} > 0,$$ [Expression 1]

$$\frac{d^2Y}{dX^2} > 0,$$

where X is a coordinate of an axial direction of the guide; a positive direction of an X-axis is a direction in which the armature is attracted through the application of exciting current; and Y is a coordinate on the guide along a direction orthogonal to the X-axis.

The above-mentioned feature is described below. A curve of a radially external side of the sectional profile of the end portion of the guide is formed as represented by both expressions in Expression 1. Specifically, as viewed on the sectional profile of the end portion of the guide, a curve which satisfies both expressions in Expression 1 is formed outward (toward a side opposite to the armature) from a radially internal end (located on a side toward the armature and serving as a reference point) of a front end side (in contact with the spacer) of the sectional profile. As a result, an outer circumferential surface of the end portion of the guide assumes the form of a curved surface whose section has the above-described curve.

The curved surface of the outer circumference of the end portion of the guide whose outer side cross-sectional shape is defined by the curve which satisfies both expressions in Expression 1 yields the following effect: position 0 in a proportional stroke of the armature corresponds to position B in the constant-force stroke in FIG. 11(b), and, after the initial stage corresponding to position 0, the rate of increase in the ratio of total permeance to stroke increases abruptly with advancement of the armature. By virtue of this, the total permeance of the magnetic circuit does not drop even after a stroke of 2 or 3 mm, whereby a stroke in which magnetic force is constant can be of 4 mm or more.

The above-mentioned sectional curve profile is delicate and is thus difficult to machine. Thus, in order to practically and substantially implement the function of the curve of the sectional profile and to facilitate machining, a plurality of stepped portions are provided such that points on the above-mentioned radially external curve (which satisfies both expressions in Expression 1) of the sectional profile of the end portion of the guide are located on respective corners of the stepped portions; in other words; such that the concave corners of the stepped portions are discretely located on the curve. An end portion of the guide having such stepped portions yields substantially the same effect as does an end portion of the guide whose sectional profile has a radially external curve which satisfies both expressions in Expression 1.

(2) In the long-proportional-stroke force motor according to the above (1), the curve is formed such that a distance between the curve and the sleeve as measured on an inner side of the guide where the armature is present is smaller than that as measured on an outer side of the guide opposite to the armature.

(3) In the long-proportional-stroke force motor according to the above (1) or (2), the sectional profile of the guide has a shape including a plurality of stepped portions formed such that the points on the curve of the sectional profile are located on respective concave corners of the stepped portions.

(4) In the long-proportional-stroke force motor according to any one of the above (1) to (3), a portion of a side surface of the armature which is located on a side toward the guide is formed into such a conical surface that a radial gap between the armature and the guide increases toward the guide.

(5) In the long-proportional-stroke force motor according to any one of the above (1) to (4), the armature has a recess including three or more stepped portions.

(6) The long-proportional-stroke force motor according to any one of the above (1) to (5) further comprises a magnetic-force-generating section and an elastic member. The magnetic-force-generating section is configured in such a manner that a coil is disposed in a space defined by the guide, the sleeve, and a housing made of a magnetic material, which constitute a magnetic path, that the guide and the sleeve are connected together via the spacer to thereby form a series magnetic circuit having a cylindrical shape, that the armature, which constitutes a magnetic path, is disposed movably within the cylindrical, the series magnetic circuit, and that a relative position between the armature and the series magnetic circuit is changed through the application of current to the coil, thereby generating magnetic force, between the armature and the series magnetic circuit, substantially proportional to the applied current. The elastic member is deformed substantially proportional to a change in the relative position between the armature and the series magnetic circuit, thereby generating elastic force directed opposite to the magnetic force.

EFFECT OF THE INVENTION

Through employment of the above-mentioned means of solution, the present invention yields the following effects.

The present invention can implement an unprecedented long proportional stroke.

Since an undesirable force-rising characteristic which conventionally arises at the initial stage of stroke can be improved to a practically usable constant-force characteristic, the stroke can be effectively used from the beginning to the end. Since the axial length of the long-proportional-force motor can be determined in accordance with the length of an effective stroke, the axial length can be shortened as compared with a conventional case.

A tapered surface is formed on the radially external side of the armature, and a plurality of annular, stepped portions having different diameters are continuously formed on the radially external side of the guide. Thus, manufacturing is facilitated.

By means of imparting a paraboloid to the recess of the armature and to the annular projection of the guide, a non-wasting magnetic path can be formed, whereby the structure can be simplified.

Furthermore, since the outer side surface of the armature is formed into a conical surface, a gap can be formed between the armature and the guide and between the armature and the cylindrical inner surface of the sleeve. Presence of this gap can improve an undesirable force-rising characteristic in a force vs. stroke characteristic.

DESCRIPTION OF REFERENCE NUMERALS

Figure 1:
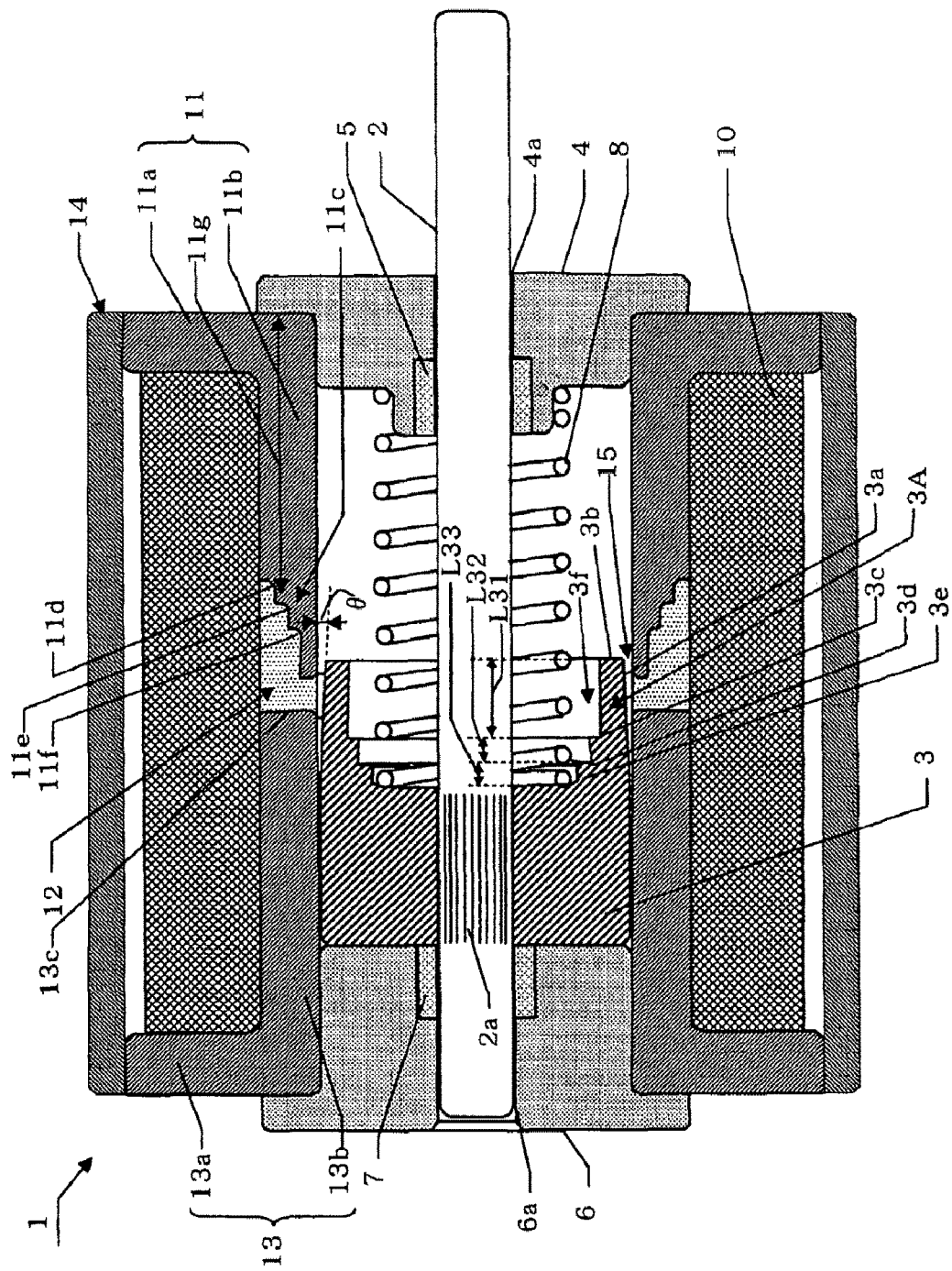
FIG. 1 Longitudinal section view of a long-proportional-stroke force motor of the present invention.

1: long-proportional-stroke force motor
2: shaft
2a: knurls
3: armature
3a: conical surface
3b: end
3c, 3d, 3e: stepped portion
3f: recess
4: front holder
4a, 6a: through-hole
5, 7: sliding bearing
6: rear holder
8: compression spring
10: coil
11: guide
11a: end plate portion
11b: cylindrical portion
11c: annular projection
11d, 11e, 11f: stepped portion
11g: longitudinal direction
12: spacer
13: sleeve
13a: end plate portion
13b: cylindrical portion
13c: face
14: housing
15: gap

BEST MODE FOR CARRYING OUT THE INVENTION

A process of deriving the means of solution of the present invention will next be described. Also, an embodiment of the present invention will be described in detail with reference to the drawings.

In order to make a magnetic force of a force motor of the present invention proportional to an exciting current in magnitude, the components, excluding an end portion of a guide and an end portion of an armature, of a magnetic circuit are designed to have, within a rated exciting current, the magnetic permeability which satisfies both expressions in Expression 2 below, $$\mu = \frac{dB}{dH} > 0,$$
$$\frac{d\mu}{dH} = \frac{d^2 B}{dH^2} < 0,$$
[Expression 2]

where μ is the magnetic permeability of material; B is the magnetic flux density in a component of the magnetic circuit; and H is the magnetic field intensity applied to the component of the magnetic circuit.

The magnetic force of the force motor satisfies Expression 3 below, $$F = \frac{1}{2} I^2 N^2 \frac{dP}{dX} = \frac{1}{2} I^2 N^2 \frac{d}{dX}\left(\frac{1}{R}\right),$$
[Expression 3]

where F is the magnetic force of the force motor; I is the exciting current applied to a coil; N is the number of turns of the coil; P is the total permeance of the magnetic circuit; R is the total magnetic resistance of the magnetic circuit; and X is the stroke of the armature. As is apparent from Expression 3, a necessary and sufficient condition for the magnetic force assuming a constant value when the exciting current and the number of turns are constant is that the rate of change in the ratio of total permeance to stroke assumes a constant value.

The total magnetic resistance of a series magnetic circuit as in the present invention is the sum of magnetic resistance of the components of the magnetic circuit. The total magnetomotive force which is applied to the magnetic circuit through the application of the exciting current is the sum of magnetomotive forces to be applied to the respective components of the magnetic circuit. When the exciting current and the number of turns of the coil are constant, the total magnetomotive force of the forte motor becomes constant. In this condition, as the armature advances from position 0 in a proportional stroke, an end portion of the guide and an end portion of the armature lower in magnetic resistance; i.e., the end portion of the guide and the end portion of the armature increase in permeance. Accordingly, the magnetomotive force which is applied to a portion of the magnetic circuit other than the end portion of the guide and the end portion of the armature increases, so that the magnetic field intensity increases, resulting in an increase in magnetic flux density B. As is represented by Expression 2, the magnetic flux density of each component, other than the end portion of the guide and the end portion of the armature, of the magnetic circuit increases as the magnetic field intensity therein increases; however, the rate of increase continues lowering. Thus, the rate of change in the ratio of permeance to stroke continues lowering with respect to the components, other than the end portion of the guide and the end portion of the armature, of the magnetic circuit. In order to make constant the rate of change in the ratio of the total permeance of the magnetic circuit to stroke along the longest possible stroke, according to conventional means as disclosed in the aforementioned Patent Document 1, a conical form is imparted to an end portion of the guide and to an end portion of the armature, whereby the rate of change in the ratio of permeance to stroke with respect to the end portion of the guide and the end portion of the armature is increased with advancement of the armature from position 0 in a proportional stroke. In this case, an inclined line of a conical, sectional profile of the end portion of the guide satisfies both expressions in Expression 4, $$\frac{dY}{dX} > 0,$$
$$\frac{d^2 Y}{dX^2} = 0,$$
[Expression 4]

Figure 11:
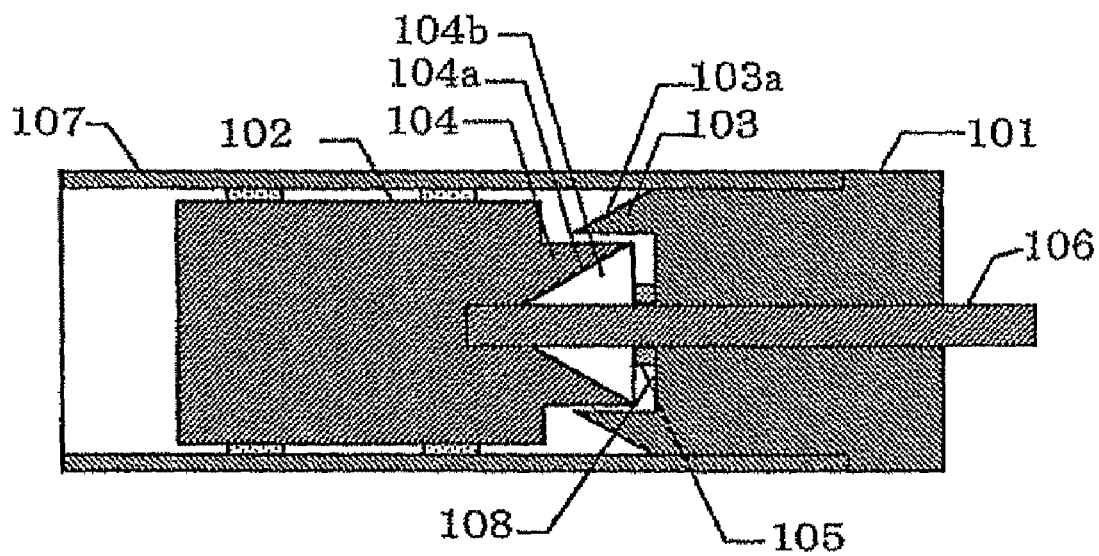
FIG. 11 Explanatory view of a proportional solenoid disclosed in Patent Document 1.
Figure 11:
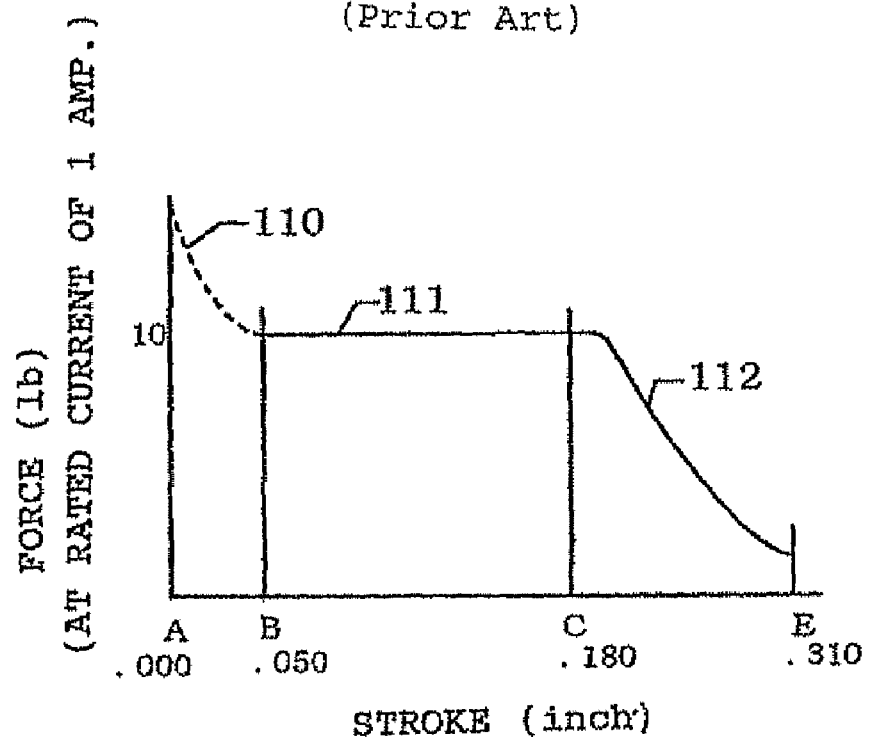

However, according to this means, the rate of change in the ratio of the total permeance of the magnetic circuit to stroke is constant merely within a stroke of 2 or 3 mm. In order to implement a proportional stroke of 4 mm or more, according to a means of solution of the present invention which has been attained on the basis of the results of numerical simulation by electromagnetic-field-analyzing software and the results of experimental research, an outer curve of a sectional profile of an end portion of the guide satisfies both expressions in Expression 1. The curved surface of the outer circumference of the end portion of the guide whose outer side cross-sectional shape is defined by the curve which satisfies both expressions in Expression 1 yields the following effect: position 0 in a proportional stroke of the armature corresponds to position B in the constant-force stroke in FIG. 11(b), and, after the initial stage corresponding to position 0, the rate of increase in the ratio of total permeance to stroke increases abruptly with advancement of the armature. By virtue of this, the total permeance of the magnetic circuit does not drop even after a stroke of 2 or 3 mm, whereby a stroke along which magnetic force is constant can be of 4 mm or more.

The above-mentioned curve of the sectional profile is delicate and is thus difficult to machine. Thus, in order to practically and substantially maintain the function of the curve of the sectional profile and to facilitate machining, a plurality of stepped portions are provided such that points on the above-mentioned radially external curve (which satisfies both expressions in Expression 1) of the sectional profile of the end portion of the guide are located on respective corners of the stepped portions; in other words; such that the corners of the stepped portions are discretely located on the curve. An end portion of the guide having such stepped portions yields substantially the same effect as does an end portion of the guide whose sectional profile has a radially external curve which satisfies both expressions in Expression 1.

In some cases, since a cylindrical portion of the guide is thin-walled due to structural limitations on the force motor, the above-mentioned curve cannot be lengthened. In such a case, another means of solution of the present invention implements a proportional stroke of 4 mm or more by means of imparting conicalness to an outer surface of an end portion of the armature as shown in FIG. 1 so as to enhance the effect of an end portion of the guide. In contrast to the example of the aforementioned Patent Document 1, since a conical portion is present on the radially external surface of the armature, the rate of change in the ratio of permeance to stroke with respect to the end portion of the guide and the end portion of the armature increases greatly with advancement of the armature, because of a greater rate of increase in the cross-sectional area of the armature and a reduction in an air gap. Also, machining and measurement are facilitated.

In order that the force motor outputs a more constant electromagnetic force along a proportional stroke of 4 mm or more, the present invention provides a plurality of stepped portions on the radially internal surface of the armature as shown in FIG. 1, thereby providing means for finely adjusting the permeance of a required locality through change in the cross-sectional area of the armature.

What has been discussed above is summarized below.

Means of Solution (1) of the Present Invention:

In the long-proportional-stroke force motor having a long proportional stroke, a curve which satisfies both expressions in Expression 1 is imparted to the sectional profile of the end portion of the guide of the series magnetic circuit.

This can elongate the proportional stroke to, for example, 4 mm or more and can produce a substantially linear attractive force vs. stroke characteristic. Also, a substantially linear attractive force vs. stroke characteristic can be produced for different driving currents.

In an embodiment described later, the above-mentioned curve is substantially formed by means of a series of stepped portions; i.e., a series of stepped portions are formed such that points on the curve correspond to respective corners of the stepped portions. In place of actually forming the special curve, the special curve can be substantially formed with ease by an easy machining process, such as cutting of stepped portions. Since magnetic resistance effectively acts such that the magnetic flux does not pass through the convex corners of stepped portions, if a path through which the magnetic flux passes is formed, the formation of stepped portions at the outside of the path does not raise any problems with respect to the path serving as a magnetic path.

Also, Expression 1 mentioned previously apparently differs from Expression 4, which is applied to the conical surface of the proportional solenoid disclosed in the aforementioned Patent Document 1.

For example, in the case of a force motor which has a guide whose cylindrical portion has a wall thickness of 2.5 mm, and which has a proportional stroke of 5 mm, a curve of a sectional profile of a front end portion of the guide satisfies Expression 5 below, $$Y=0.030X^2+0.304X+0.620.$$ [Expression 5]

The present invention implements proportional strokes of 4 mm and 5 mm when the cylindrical portion of the guide has a wall thickness of 2.5 mm. The present invention can also work out a longer proportional stroke. In the case of a force motor having a proportional stroke of 5 mm, dimensions of the force motor are identical with those of a force motor having a proportional stroke of 4 mm, except for dimensions of an end portion of the guide and an end portion of the armature. What differs is the number of stepped portions and the diameter of the end portion of the guide and the angle of a conical surface of the end portion of the armature.

Through employment of the above-described means of solution (1) of the present invention; i.e., means for imparting a curve which satisfies both expressions in Expression 1, to a sectional profile of an end portion of the guide of the series magnetic circuit, the attractive force vs. stroke characteristic curve exhibits linearity of a practically required level. When the required level of linearity is considerably high; in other words, when required linearity is of a microscopically high level, the above-described means of solution (1) of the present invention is combined with the following means of solution (2), which serves as a means of fine adjustment.

Means of Solution (2) of the Present Invention:

In a long-proportional-stroke force motor having an elongated proportional stroke, a conical surface is imparted to the radially external surface of an end portion of the armature such that the gap between the armature and the guide increases toward the end of the guide. This yields the following effect: at the initial stage of stroke, the magnetic resistance of the gap is increased to thereby reduce the magnetic attractive force, and, as the stroke progresses, the gap is gradually reduced, thereby establishing a substantially constant attractive force characteristic. The angle of the conical surface with respect to the radially internal surface of the guide can be determined arbitrarily.

Through employment of the above-described means of solution (1) of the present invention; i.e., means for imparting a curve which satisfies both expressions in Expression 1, to the sectional profile of an end portion of the guide of the series magnetic circuit, as well as the means of solution (2) of the present invention; i.e., means for imparting a conical surface to the radially outer surface of an end portion of the armature, the attractive force vs. stroke characteristic curve exhibits linearity of a practically required level. When the required level of linearity is extremely high; in other words, it is required to provide linearity even when super-microscopically observed, the above-described means of solution (1) and (2) of the present invention are combined with the following means of solution (3), which serves as a means of fine adjustment.

Means of Solution (3) of the Present Invention:

In a long-proportional-stroke force motor having an elongated proportional stroke, the armature is configured such that an annular projection projects from an axial end of a column. A plurality of; herein, three, stepped portions having different diameters are continuously formed in the armature from an end of the annular projection, thereby forming a recess. In order that the force motor outputs a more constant electromagnetic force along a proportional stroke, the recess serves as means for finely adjusting the permeance of a required locality through change in the cross-sectional area of the armature to thereby establish a substantially constant attractive force characteristic.

The effect of selective application of the means of solution (2) and (3) will be verified with respect to a long-proportional-stroke force motor to which the means of solution (1) is applied as shown in FIG. 1.

Figure 10:
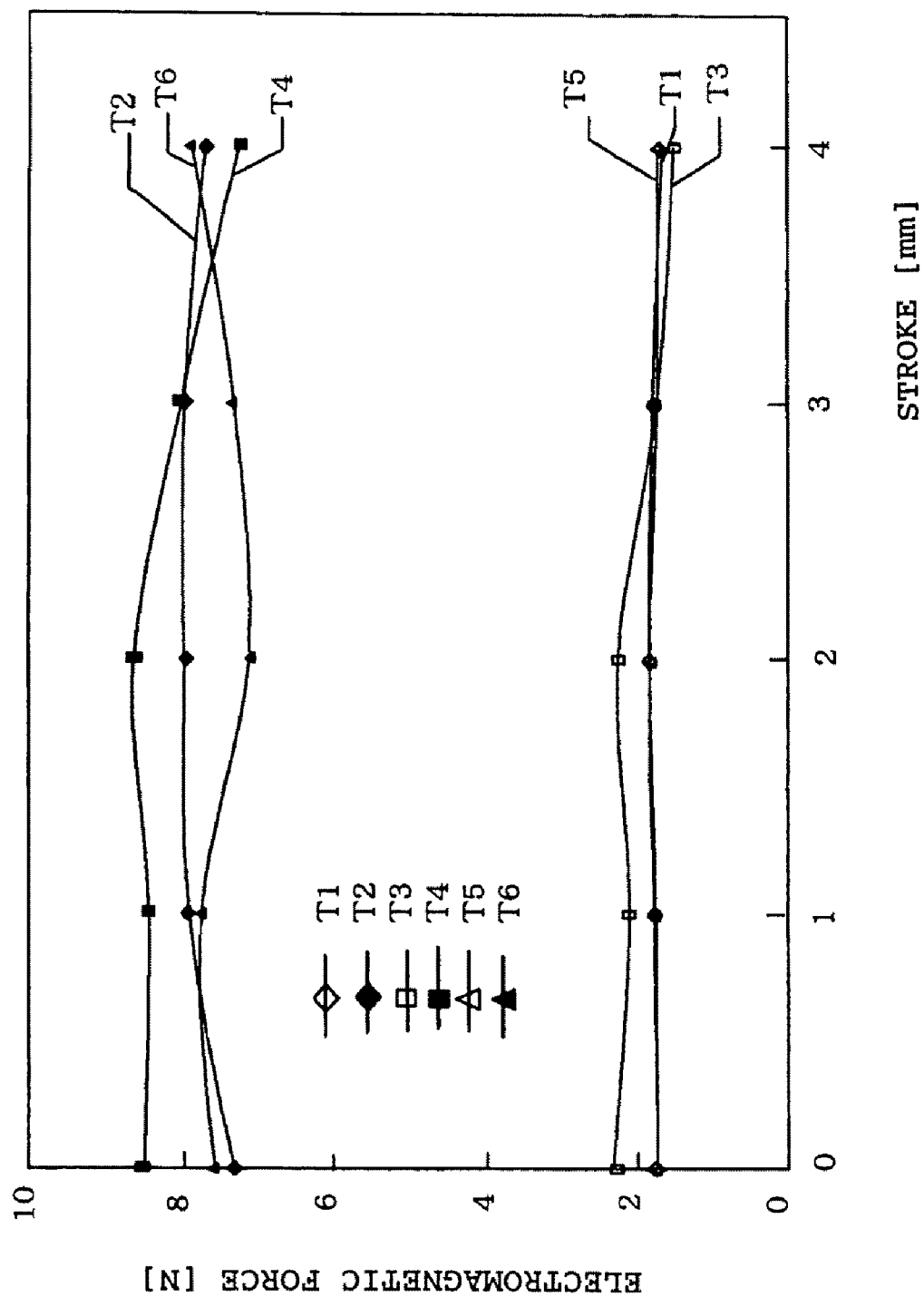
FIG. 10 View for explaining the influence of the structure of an armature on an electromagnetic force of the long-proportional-stroke force motor of the present invention.

FIG. 10 is a view for explaining the influence of the structure of the armature on the electromagnetic force of the long-proportional-stroke force motor of the present invention.

A conical surface on the radially external surface of the armature which is discussed herein denotes a conical surface 3a in FIG. 1. Similarly, the stepped portions which are formed on the radially internal surface of the armature and discussed herein denote stepped portions 3c, 3d, and 3e in FIG. 1.

In FIG. 10, a characteristic curve T1 is an electromagnetic force vs. stroke characteristic in the case where the exciting current is 0.093 A; the conical surface is present on the radially external surface of the armature; and the stepped portions are present on the radially internal surface of the armature.

Similarly, a characteristic curve T2 is an electromagnetic force vs. stroke characteristic in the case where the exciting current is 0.279 A; the conical surface is present on the radially external surface of the armature; and the stepped portions are present on the radially internal surface of the armature.

A characteristic curve T3 is an electromagnetic force vs. stroke characteristic in the case where the exciting current is 0.093 A; the conical surface is absent on the radially external surface of the armature; and the stepped portions are present on the radially internal surface of the armature.

Similarly, a characteristic curve T4 is an electromagnetic force vs. stroke characteristic in the case where the exciting current is 0.279 A; the conical surface is absent on the radially external surface of the armature; and the stepped portions are present on the radially internal surface of the armature.

A characteristic curve T5 is an electromagnetic force vs. stroke characteristic in the case where the exciting current is 0.093 A; the conical surface is present on the radially external surface of the armature; and the stepped portions are absent on the radially internal surface of the armature.

Similarly, a characteristic curve T6 is an electromagnetic force vs. stroke characteristic in the case where the exciting current is 0.279 A; the conical surface is present on the radially external surface of the armature; and the stepped portions are absent on the radially internal surface of the armature.

These characteristics are summarized below in Table 1.

TABLE 1

Influence of structure of armature on electromagnetic force of force motor

| T (condition No.) Stroke | T1 | T2 | T3 | T4 | T5 | T6 |
| --- | --- | --- | --- | --- | --- | --- |
| 0.00 | 1.75 | 7.30 | 2.30 | 8.45 | 1.75 | 7.55 |
| 1.00 | 1.75 | 7.85 | 2.07 | 8.40 | 1.75 | 7.70 |
| 2.00 | 1.85 | 7.95 | 2.20 | 8.60 | 1.85 | 7.10 |
| 3.00 | 1.70 | 7.95 | 1.75 | 8.00 | 1.70 | 7.30 |
| 4.00 | 1.70 | 7.70 | 1.50 | 7.25 | 1.70 | 7.85 |

As is apparent from the characteristic curves in FIG. 10, in spite of providing an unprecedented long stroke, the electromagnetic force characteristic is greatly improved. For example, in conditions T1 and T2, in which the conical surface is present on the radially external surface of the armature and in which the stepped portions are present on the radially internal surface of the armature, the characteristic curves exhibit the highest linearity in the respective groups of the same exciting current and is deemed to be practically straight. In conditions T5 and T6, in which the conical surface is present on the radially external surface of the armature and in which the stepped portions are absent on the radially internal surface of the armature, the characteristic curves exhibit the second highest linearity in the respective groups of the same exciting current and is deemed to be substantially straight and to practically raise no problems.

In conditions T3 and T4, in which the conical surface is absent on the radially external surface of the armature and in which the stepped portions are present on the radially internal surface of the armature, the characteristic curves exhibit the third highest linearity in the respective groups of the same exciting current and is deemed to exhibit greatly improved linearity as compared with conventional counterparts and to practically raise no problems.

In summary, the means of solution (3) of the present invention can improve the linearity of the stroke vs. electromagnetic force characteristic as described above. Further, the means of solution (2) of the present invention can more improve the linearity of the stroke vs. electromagnetic force characteristic than does the means of solution (3) of the present invention.

Accordingly, by means of combining the means of solution (1) of the present invention with the means of solution (2) and the means of solution (3) as appropriate, the stroke vs. electromagnetic force characteristic can be improved more as compared with the case where only the means of solution (1) is employed.

EMBODIMENT

The present invention is embodied essentially on the basis of the means of solution (1) and, as needed, in additional combination with the means of solution (2) and the means of solution (3).

An embodiment to be described below with reference to the drawings employs all of the means of solution (1), (2), and (3) of the present invention. The following description of the embodiment will clarify the basic configuration, action, effect, and the like of the means of solution (1), (2), and (3) of the present invention.

FIG. 1 is a sectional view of a long-proportional-stroke force motor 1 according to an embodiment of the present invention.

An armature 3 is fixed to a shaft 2 via knurls 2a on a surface of the shaft 2.

The armature 3 has a column portion and an annular projection 3A projecting from an axial end thereof. The radially external surface of the annular projection 3A is formed into a conical surface 3a having a small slope angle θ. A plurality of stepped portions 3c, 3d, and 3e having different diameters are continuously formed in the armature 3 from an end 3b of the annular projection 3A, thereby forming a recess 3f. An axial length L31 from the end 3b to the stepped portion 3c is longer than an axial length L32 from the stepped portion 3c to the stepped portion 3d and an axial length L33 from the stepped portion 3d to the stepped portion 3e. Preferably, the stepped portions are positioned such that a line connecting the concave corners of the stepped portions assumes the form of a parabola. Also, a paraboloid may replace a continuously stepped surface formed by the stepped portions.

One end of the shaft 2 is inserted through a through-hole 4a of a front holder 4 made of a non-magnetic material and is supported by a sliding bearing 5 provided in the front holder 4. The other end of the shaft 2 is inserted through a through-hole 6a of a rear holder 6 made of a non-magnetic material and is supported by a sliding bearing 7 provided in the rear holder 6.

A spring 8, which functions as a compression spring and provides a force opposite to the electromagnetic force, is provided in contact with the front holder 4 and with the recess 3f of the armature 3. By adjusting the magnitude of the exciting current, the armature can be moved to and kept at any positions in the stroke where the spring force balances with the electromagnetic force.

An excitation coil 10 is accommodated within a magnetic circuit (a guide, a spacer, a sleeve, and a housing) having a rectangular, tubular section.

A guide 11 is made of a magnetic material, particularly a ferromagnetic material, and is configured such that a cylindrical portion 11b is joined to the inner circumference of an annular end plate portion 11a. A free end portion of the cylindrical portion 11b which is not joined to the end plate portion 11a serves as an annular projection 11c. A plurality of stepped portions 11d, 11e, and 11f are continuously provided on the annular projection 11c in such a manner that a length 11g along a longitudinal direction of the cylindrical portion 11b increases toward the inner circumference from the outer circumference. Preferably, the stepped portions are positioned such that a line connecting the concave corners of the stepped portions assumes the form of a parabola. Also, a paraboloid may replace a continuously stepped surface formed by the stepped portions.

A plurality of the stepped portions 11d, 11e, and 11f having different diameters provided on the annular projection 11c, which is a cylindrical portion of the guide 11, are formed such that the radial thickness difference between adjacent stepped portions having different diameters gradually reduces toward the armature.

A sleeve 13 is made of a magnetic material, particularly a ferromagnetic material, and is configured such that a cylindrical portion 13b is joined to the inner circumference of an annular end plate portion 13a. A free end, opposite to the end plate portion 13a, of the cylindrical portion 13b is formed into a face 13c orthogonal to the axial direction.

A non-magnetic material; for example, a synthetic resin, is charged between the cylindrical portion 11b of the guide 11 and the cylindrical portion 13b of the sleeve 13, thereby forming a spacer 12. The spacer 12 biases, toward the armature, the magnetic flux which passes through the guide 11 and through the sleeve 13.

The radially internal surface (inner circumferential surface) of the cylindrical portion 11b of the guide 11, that of the spacer 12, and that of the cylindrical portion 13b of the sleeve 13 constitute a continuous cylindrical surface for allowing smooth movement of the armature 3. In order to form a gap 15, in accordance with the progress of stroke, between the radially external surface 3a of the armature 3 and the radially internal surface of the cylindrical portion 11b of the guide 11 and between the radially external surface 3a of the armature 3 and the radially internal surface of the cylindrical portion 13b of the sleeve 13, the radially external surface 3a of the armature 3 is formed into a conical surface.

A cylindrical housing 14 is made of a magnetic material and partially constitutes a magnetic path. The housing 14 is disposed so as to close the opening of a magnetic circuit comprised of the guide 11, the spacer 12, and the sleeve 13 and having a section resembling a squarish letter U.

According to feature 1 of the structure of Embodiment 1, the radially external surface 3a of the armature 3 is formed into a conical surface, thereby providing means for forming the gap 15, in accordance with the progress of stroke, between the radially external surface 3a of the armature 3 and the radially internal surface of the cylindrical portion 11b of the guide 11 and between the radially external surface 3a of the armature 3 and the radially internal surface of the cylindrical portion 13b of the sleeve 13.

According to feature 2 of the structure of Embodiment 1, a plurality of the stepped portions having different diameters are continuously formed in the armature 3 from the end of the annular projection 3A, thereby forming the recess 3f.

According to feature 3 of the structure of Embodiment 1, a plurality of stepped portions having different diameters are formed on the annular projection 11c of the guide 11 in such a manner that the length 11g of the cylindrical portion 11b increases toward the inner circumference from the outer circumference.

According to feature 4 of the structure of Embodiment 1, the radially external surface of an end portion of the guide and the radially internal surface of an end portion of the armature assume the form of a plurality of continuously formed stepped portions in such a manner as to approximate a paraboloid. By virtue of this feature, the electromagnetic force vs. stroke characteristic can be such that a stroke along which force is constant is lengthened.

(Characteristics)

Figure 2:
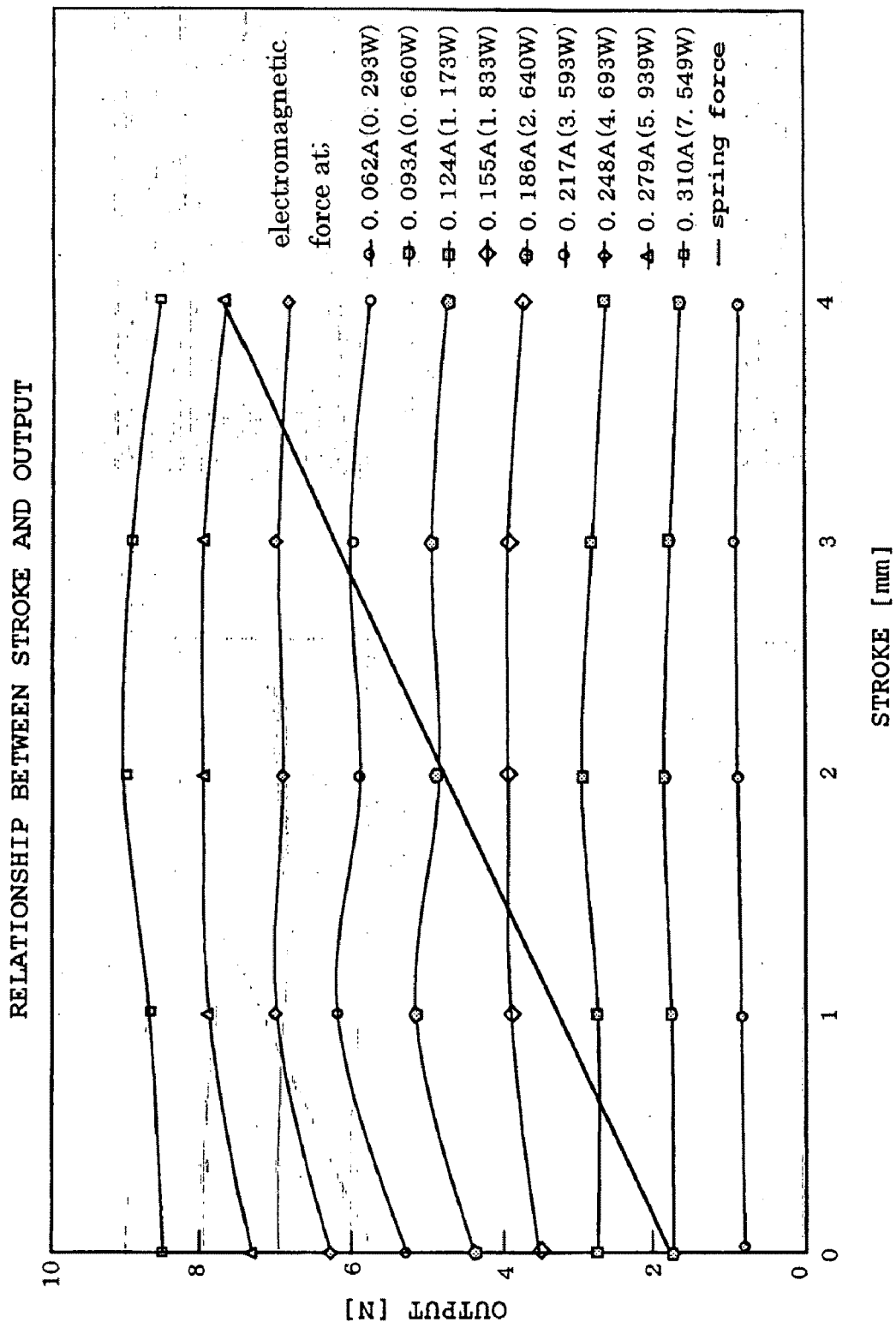
FIG. 2 Graph showing the relationship between output and stroke of a long-proportional-stroke force motor according to Embodiment 1 of the present invention for different exciting currents applied to the motor.

Table 2 and FIG. 2 show the relationship between output and stroke in the long-proportional-stroke force motor of Embodiment 1.

TABLE 2

Output vs. stroke in force motor

| | Current (A) | Power (W) | Output at points in stroke (N) | | | | |
|---|---|---|---|---|---|---|---|
| | | | 0 mm | 1 mm | 2 mm | 3 mm | 4 mm |
| 1 | 0.062 | 0.293 | 0.800 | 0.850 | 0.900 | 0.900 | 0.850 |
| 2 | 0.093 | 0.660 | 1.700 | 1.750 | 1.800 | 1.750 | 1.650 |
| 3 | 0.124 | 1.173 | 2.700 | 2.700 | 2.950 | 2.800 | 2.650 |
| 4 | 0.155 | 1.833 | 3.500 | 3.900 | 3.900 | 3.900 | 3.700 |
| 5 | 0.186 | 2.640 | 4.300 | 5.150 | 4.850 | 4.950 | 4.750 |
| 6 | 0.217 | 3.593 | 5.500 | 6.200 | 5.850 | 6.000 | 5.750 |
| 7 | 0.248 | 4.693 | 6.250 | 7.000 | 6.900 | 6.950 | 6.850 |
| 8 | 0.279 | 5.939 | 7.300 | 7.850 | 7.950 | 7.950 | 7.650 |
| 9 | 0.310 | 7.549 | 8.400 | 8.650 | 8.950 | 8.900 | 7.550 |

As for units in Table 2 and FIG. 2, current is represented by ampere (A); power by watt (W); and output by Newton (N).

As shown in FIG. 2, the relationship between output and stroke is as follows. At a small exciting current; for example, at 0.062 A and 0.092 A, the characteristic curve is almost straight along the entire stroke ranging from 0 mm to 4 mm. At other currents, the characteristic raises no problems in use as a proportional force motor.

At a current of 0.186 A and 0.217 A, the characteristic shows some fluctuations at a stroke ranging from 0 mm to 1 mm in FIG. 2. However, in the range of stroke, a working point (the intersection of the characteristic curve with the elastic-force curve of the compression spring) is absent; therefore, no problem practically arises.

(Verification of Shape of Magnetic Path)

The validity, in terms of forming a magnetic path, of the shape of the armature 3 and the guide 11 of the above embodiment will be described with reference to the results of the electromagnetic field simulation. The shape of a magnetic path will next be studied from the degree of concentration of magnetic flux density. The saturated magnetic flux density of a material of the guide is 1.67 Tesla.

Figure 3:
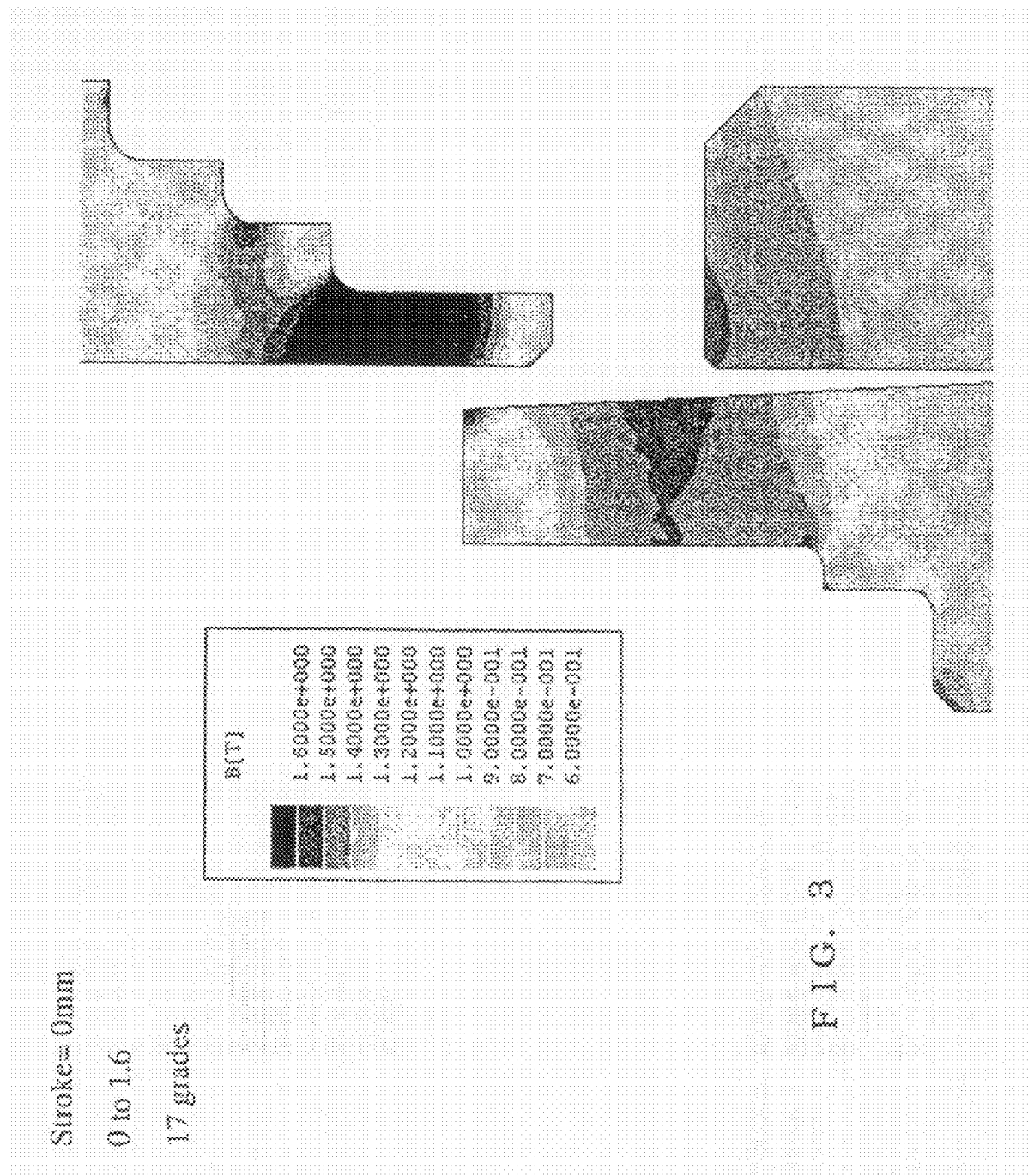
FIG. 3 Explanatory view showing, in gray scale, the distribution of magnetic flux density at a stroke of 0 mm and an exciting current of 0.062 A.

FIG. 3 is an explanatory view showing, in gray scale, the distribution of magnetic flux density at an exciting current of 0.062 A when the armature is positioned at a stroke of 0 mm.

The formation of a magnetic path can be seen at the projecting end portion of the armature and at the projecting end portion of the guide. The thinner the shading of a portion, the lower the magnetic flux density passing through the portion. As is apparent from FIG. 3, when the armature is located at this position, the magnetic flux which passes through the magnetic circuit is limited mainly by the wall thickness of the endmost stepped portion of the guide and the angle of the conical surface of the end portion of the armature.

Figure 4:
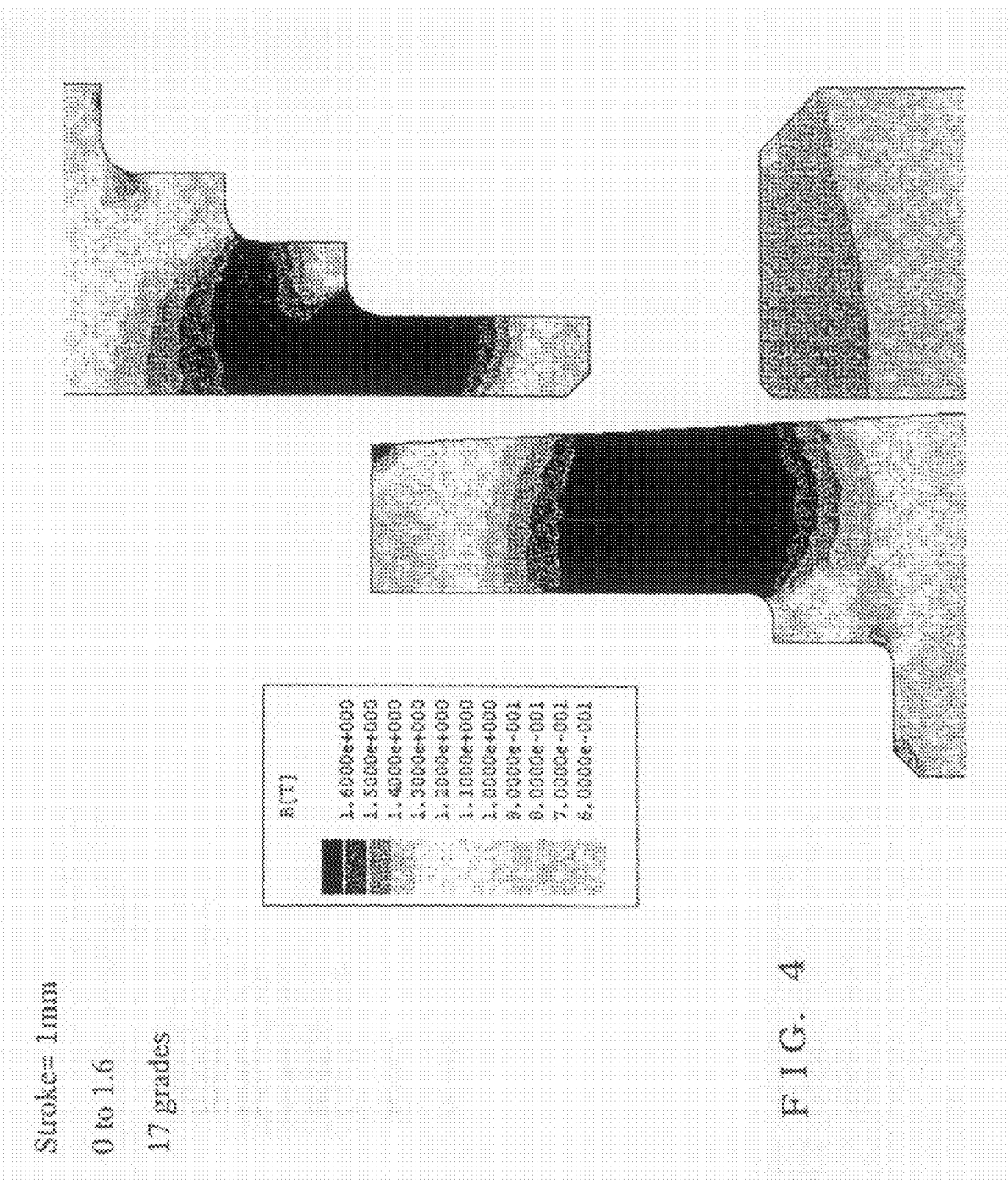
FIG. 4 Explanatory view showing, in gray scale, the distribution of magnetic flux density at a stroke of 1 mm and an exciting current of 0.062 A.

FIG. 4 is an explanatory view showing, in gray scale, the distribution of magnetic flux density at an exciting current of 0.062 A when the armature is positioned at a stroke of 1 mm.

As is apparent from FIG. 4, when the armature is located at this position, the magnetic flux which passes through the magnetic circuit is limited mainly by the position of the concave corner between the endmost stepped portion and the second stepped portion of the guide and the angle of the conical surface of the end portion of the armature. Also, as is apparent from FIG. 4, substantially no magnetic flux passes through the convex corner portion of the second stepped portion.

Figure 5:
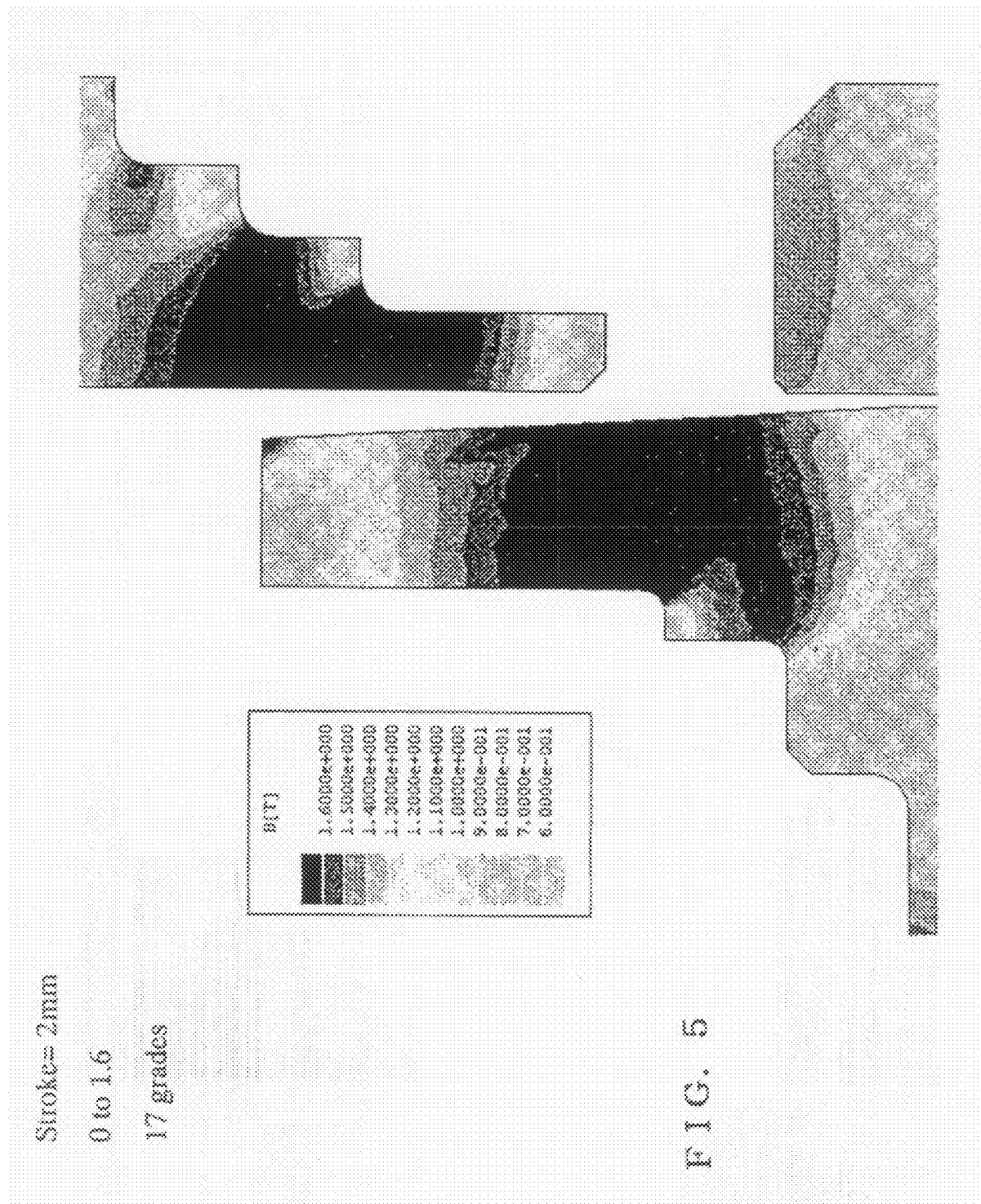
FIG. 5 Explanatory view showing, in gray scale, the distribution of magnetic flux density at a stroke of 2 mm and an exciting current of 0.062 A.

FIG. 5 is an explanatory view showing, in gray scale, the distribution of magnetic flux density at an exciting current of 0.062 A when the armature is positioned at a stroke of 2 mm.

As is apparent from FIG. 5, when the armature is located at this position, the magnetic flux which passes through the magnetic circuit is limited mainly by the position of the concave corner between the second stepped portion and the third stepped portion of the guide, the position of the concave corner between the endmost stepped portion and the second stepped portion of the guide, and the angle of the conical surface of the end portion of the armature. Also, as is apparent from FIG. 5, substantially no magnetic flux passes through the convex corner portion of the second stepped portion.

Figure 6:
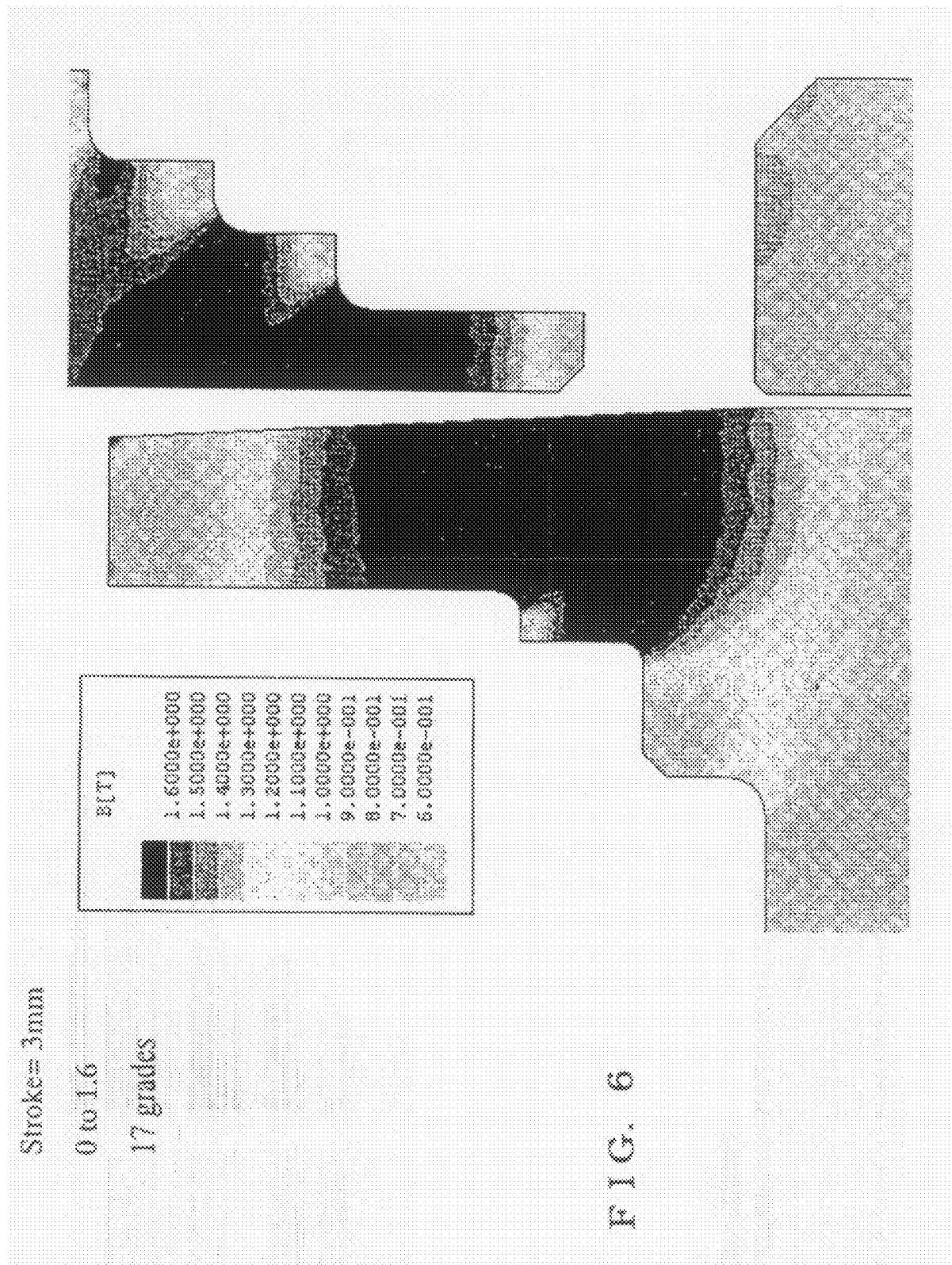
FIG. 6 Explanatory view showing, in gray scale, the distribution of magnetic flux density at a stroke of 3 mm and an exciting current of 0.062 A.

FIG. 6 is an explanatory view showing, in gray scale, the distribution of magnetic flux density at an exciting current of 0.062 A when the armature is positioned at a stroke of 3 mm.

As is apparent from FIG. 6, when the armature is located at this position, the magnetic flux which passes through the magnetic circuit is limited mainly by the position of the concave corner between the second stepped portion and the third stepped portion of the guide, the position of the concave corner between the endmost stepped portion and the second stepped portion of the guide, and the angle of the conical surface of the end portion of the armature; furthermore, the magnetic flux density begins to rise at the position of the concave corner between the third stepped portion and the fourth stepped portion. Also, as is apparent from FIG. 6, substantially no magnetic flux passes through the convex corner portion of the second stepped portion and the convex corner portion of the third stepped portion.

Figure 7:
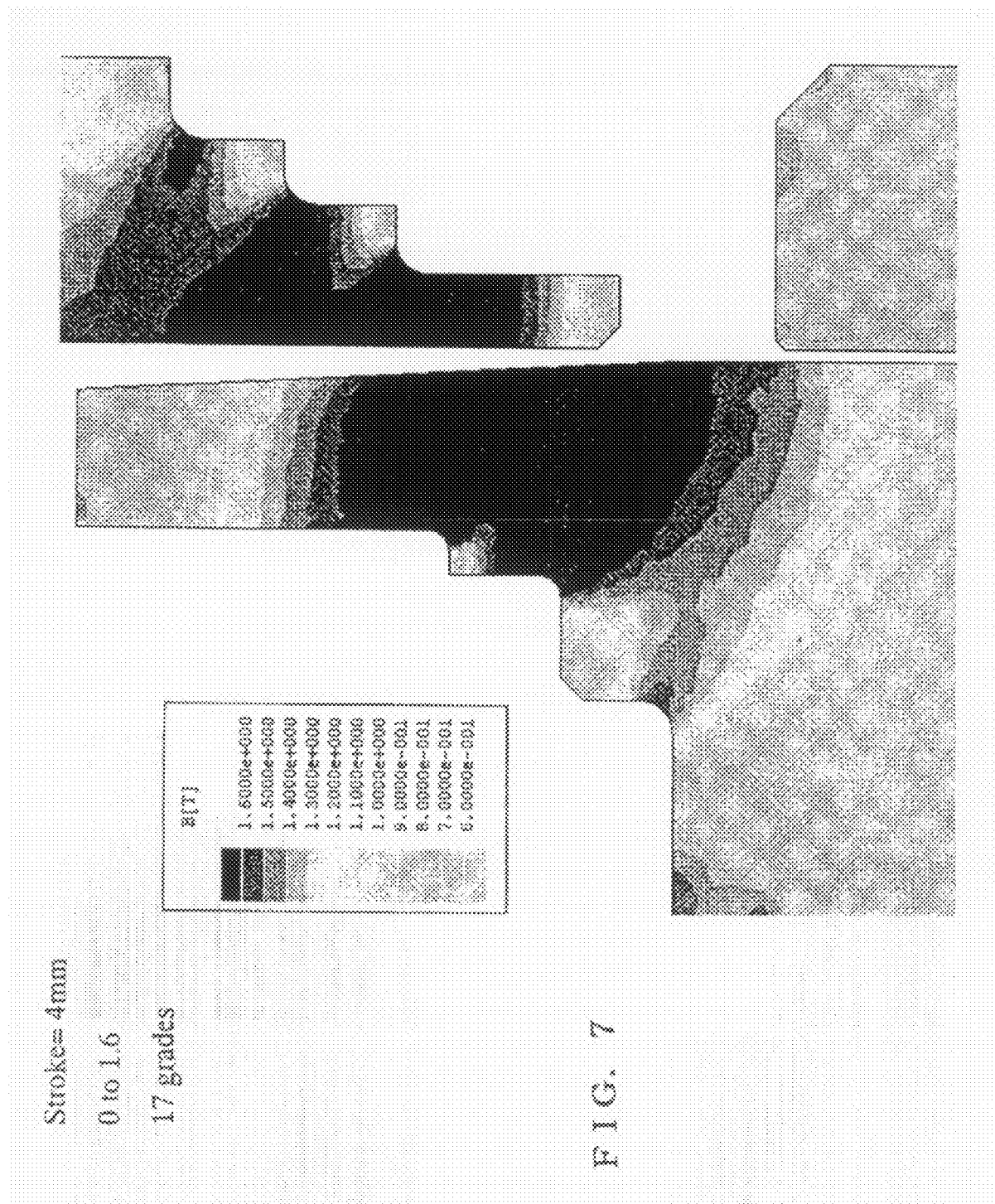
FIG. 7 Explanatory view showing, in gray scale, the distribution of magnetic flux density at a stroke of 4 mm and an exciting current of 0.062 A.

FIG. 7 is an explanatory view showing, in gray scale, the distribution of magnetic flux density at an exciting current of 0.062 A when the armature is positioned at a stroke of 4 mm.

As is apparent from FIG. 7, in contrast to FIG. 6, when the armature is located at this position, the magnetic flux which passes through the magnetic circuit is limited mainly by the position of the concave corner between the second stepped portion and the third stepped portion of the guide, the position of the concave corner between the endmost stepped portion and the second stepped portion of the guide and, the angle of the conical surface of the end portion of the armature; furthermore, the magnetic flux density is high at the position of the concave corner between the third stepped portion and the fourth stepped portion, and the magnetic flux density is high in the armature. Also, as is apparent from FIG. 7, substantially no magnetic flux passes through the convex corner portions of the second stepped portion, the third stepped portion, and the fourth stepped portion.

Figure 8:
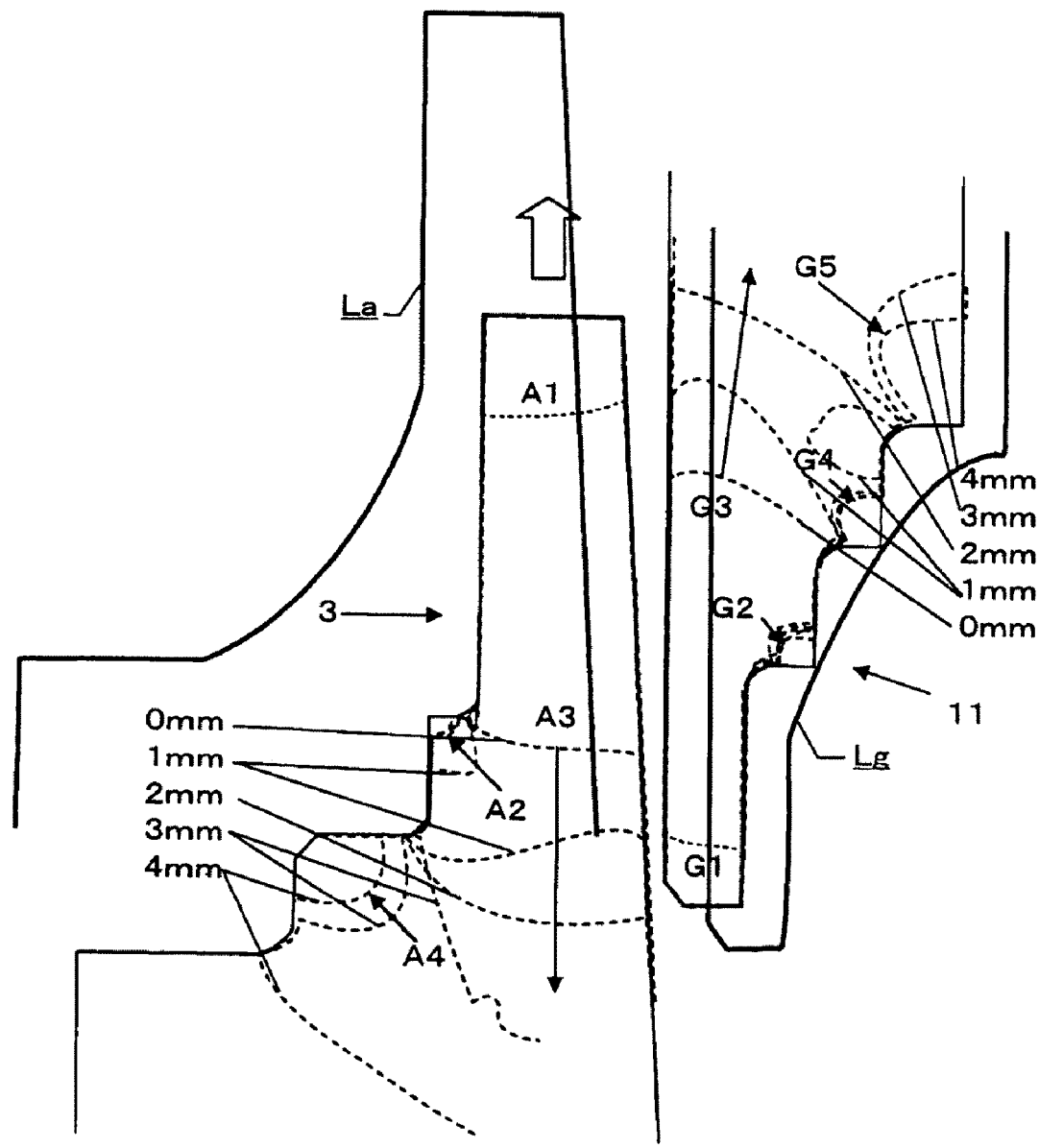
FIG. 8 Explanatory view summarizing a change in a region of high magnetic flux density from FIG. 3 to FIG. 7.

FIG. 8 is an explanatory view summarizing a change in magnetic flux density from FIG. 3 to FIG. 7. The positional relationship between the armature and the guide is that when the armature is positioned at a stroke of 4 mm. The dotted lines indicating regions of a high magnetic flux density correspond to those in FIGS. 3 to 7.

A sectional profile of the guide which is required for attaining a constant magnetic force will be described from a change in the magnetic flux density passing through the stepped portions of the guide and with reference to FIG. 8. Similarly, a required sectional profile of the armature will be described.

Region G1 of the guide is required depending on the stroke, but includes some margin at the end portion. This structure is required with respect to the formation of a magnetic path for the following reason. When the armature is positioned at a proportional stroke of 0 mm, the thin wall thickness of the endmost stepped portion of the guide and a wide air gap between the armature and the guide provide a high magnetic resistance. The high magnetic resistance reduces magnetic flux which passes through the magnetic circuit, and causes partial leakage of magnetic flux, thereby restraining an undesirable force-rising characteristic which is conventionally observed at the initial stage of stroke as in the case of the proportional solenoid disclosed in the aforementioned Patent Document 1.

Substantially no magnetic flux passes through region G2, region G4, and region G5; therefore, these regions are not required with respect to the formation of a magnetic path and thus can be eliminated. Region G3 is required.

Region A1 of the armature is required depending on the stroke, but includes some margin at the end portion. As mentioned above, this structure is required, since the structure restrains an undesirable force-rising characteristic which is conventionally observed at the initial stage of stroke as in the case of the proportional solenoid disclosed in the aforementioned Patent Document 1. Substantially no magnetic flux passes through region A2 and region A4; therefore, these regions are not required and thus can be eliminated. Region A3 is required.

Figure 9:
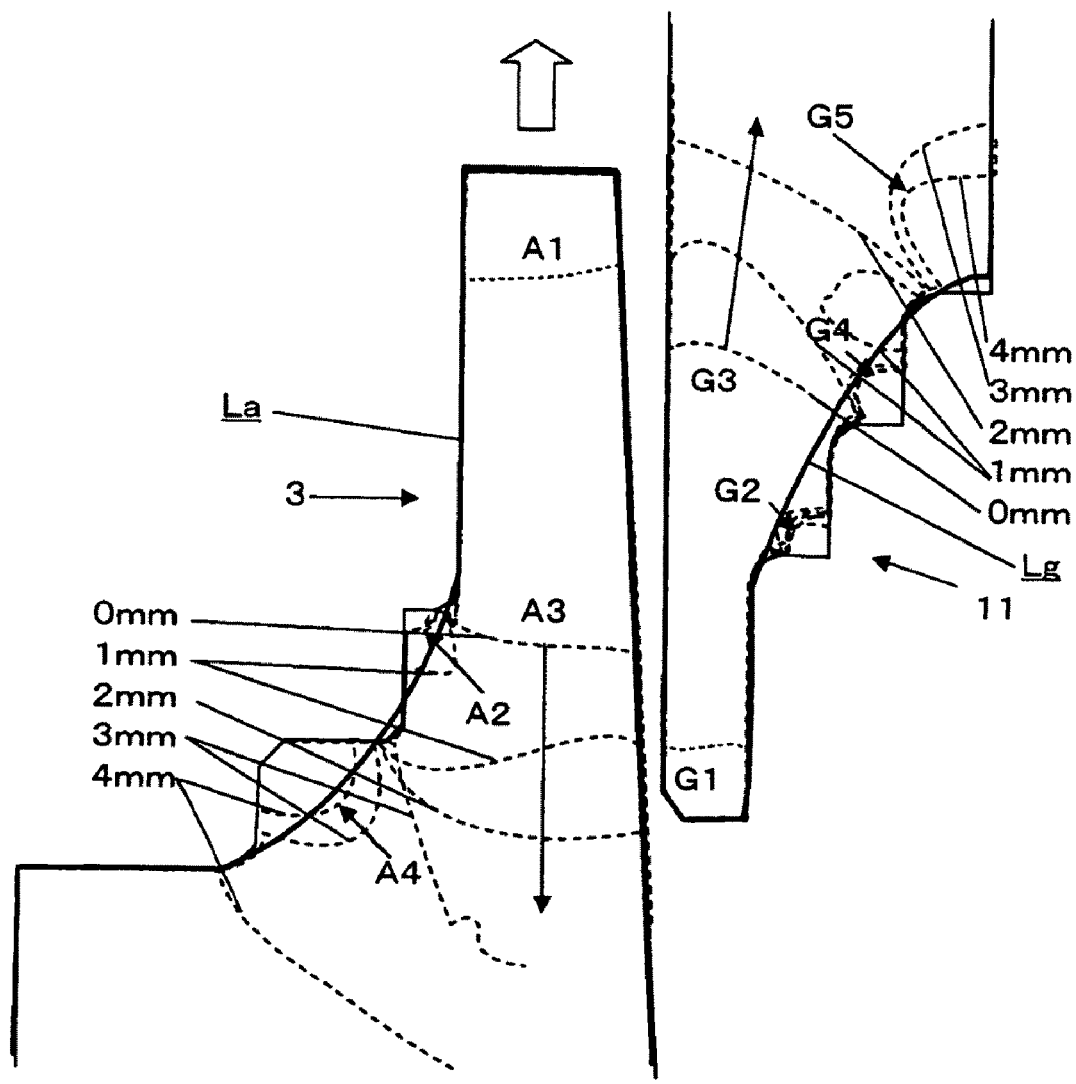
FIG. 9 Explanatory view summarizing the results of study having been conducted with reference to FIG. 8.

FIG. 9 is an explanatory view summarizing the results of study having been conducted with reference to FIG. 8.

In terms of a magnetic circuitry, the sectional profile of the recess of the armature in FIG. 8 is represented by line La of FIG. 9, and the sectional profile of the stepped portions of the guide is represented by line Lg of FIG. 9. In FIG. 9, line La and line Lg are outlines of portions of the sectional profiles of the armature and the guide, each sectional profile having a plurality of continuously formed stepped portions, as viewed after eliminating, from the sectional profiles, those regions which do not contribute to the formation of a magnetic circuit which provides a constant magnetic force. As shown in FIG. 9, line La and line Lg are parabolas. Line La and line Lg appearing in FIG. 8 are line La and line Lg of FIG. 9 which are shown in FIG. 8 for reference.

Employing continuous stepped portions for approximating a slope surface of a long-proportional-stroke force motor facilitates manufacturing, since machining such stepped portions is easy.

The invention claimed is:

1. A long-proportional-stroke force motor comprising: a magnetic circuit formed of: a guide made of a magnetic material, a sleeve made of a magnetic material, and a spacer made of a non-magnetic material and disposed between the guide and the sleeve, the guide, the spacer and the sleeve forming an inner cylindrical surface defining an inner cylindrical opening; and an armature made of a magnetic material and disposed movably in the inner cylindrical opening; wherein the guide has an end portion adjacent to the spacer, and the end portion of the guide has a sectional profile including, at a side opposite the armature, points located on a curve, which curve satisfies both of the following expressions:

$$\frac{dY}{dX} > 0,$$

$$\frac{d^2Y}{dX^2} > 0,$$

where X is a coordinate on an axis of the guide; where a positive direction on the X-axis is a direction in which the armature is attracted through the application of exciting current; and where Y is a coordinate on the guide along a direction orthogonal to the X-axis; wherein the sectional profile of the guide has a shape including a plurality of stepped portions formed such that the points on the curve of the sectional profile are located on respective concave corners of the stepped portions; wherein the armature has an armature end portion with a conical surface facing the inner cylindrical surface, the conical surface defining, in cooperation with the inner cylindrical surfaces, a radial gap between the inner cylindrical surface and the armature, which gap increases toward the guide; and wherein the armature end portion has a recess including three or more stepped portions.

2. A long-proportional-stroke force motor according to claim 1, wherein an axial distance between the guide and the sleeve as measured on an inner side of the guide facing the armature is smaller than that as measured on an outer side of the guide opposite to the armature.

3. A long-proportional-stroke force motor according to claim 1, further comprising a magnetic-force-generating section and an elastic member, wherein the magnetic-force-generating section includes a coil disposed in a space defined by the guide, the sleeve, and a housing made of a magnetic material, which form a magnetic path, wherein the guide and the sleeve each have a cylindrical shape and are connected together via the spacer in series within the magnetic circuit, and wherein a relative position between the armature and the magnetic circuit is changed through the application of current to the coil, thereby generating magnetic force between the armature and the magnetic circuit, substantially proportional to the applied current in magnitude, and wherein the elastic member is deformed substantially proportional to a change in the relative position between the armature and the magnetic circuit, thereby generating an elastic force in opposition to the magnetic force.

4. A long-proportional-stroke force motor according to claim 2, further comprising a magnetic-force-generating section and an elastic member, wherein the magnetic-force-generating section includes a coil disposed in a space defined by the guide, the sleeve, and a housing made of a magnetic material, which form a magnetic path, wherein the guide and the sleeve each have a cylindrical shape and are connected together via the spacer in series within the magnetic circuit, and wherein a relative position between the armature and the magnetic circuit is changed through the application of current to the coil, thereby generating magnetic force between the armature and the magnetic circuit, substantially proportional to the applied current in magnitude, and wherein the elastic member is deformed substantially proportional to a change in the relative position between the armature and the magnetic circuit, thereby generating an elastic force in opposition to the magnetic force.

* * * * *

UNITED STATES PATENT AND TRADEMARK OFFICE
CERTIFICATE OF CORRECTION

PATENT NO. : 7,688,169 B2 Page 1 of 1
APPLICATION NO. : 11/919876
DATED : March 30, 2010
INVENTOR(S) : Shen Zhao It is certified that error appears in the above-identified patent and that said Letters Patent is hereby corrected as shown below:

Title Page, item [57] Abstract:
The formulas appearing after line 9 should read:

$$\frac{dY}{dX} > 0$$

$$\frac{d^2Y}{dX^2} > 0$$

Signed and Sealed this

Twenty-fifth Day of May, 2010

David J. Kappos
*Director of the United States Patent and Trademark Office*